United States Patent
Kemmerling et al.

(10) Patent No.: US 9,726,089 B2
(45) Date of Patent: Aug. 8, 2017

(54) METHOD FOR PERFORMING A CHARGE EXCHANGE IN AN INTERNAL COMBUSTION ENGINE

(71) Applicant: Ford Global Technologies, LLC, Dearborn, MI (US)

(72) Inventors: Joerg Kemmerling, Monschau (DE); Franz Arnd Sommerhoff, Aachen (DE); Helmut Matthias Kindl, Aachen (DE); Vanco Smiljanovski, Bedburg (DE); Claudia Katharina Herudek, Aachen (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 14/641,950

(22) Filed: Mar. 9, 2015

(65) Prior Publication Data

US 2015/0267624 A1    Sep. 24, 2015

(30) Foreign Application Priority Data

Mar. 24, 2014    (DE) .................. 10 2014 205 414

(51) Int. Cl.
*F02D 13/02*    (2006.01)
*F02D 41/00*    (2006.01)
*F02B 25/14*    (2006.01)

(52) U.S. Cl.
CPC ........ *F02D 13/0207* (2013.01); *F02B 25/145* (2013.01); *F02D 13/0273* (2013.01); *F02D 41/0007* (2013.01); *F02D 2041/001* (2013.01); *Y02T 10/144* (2013.01); *Y02T 10/18* (2013.01)

(58) Field of Classification Search
CPC .. F02D 13/02; F02D 13/0207; F02D 13/0273; F02D 28/00; F02D 2041/001; F02B 25/145; Y02T 10/144; Y02T 10/18
USPC .......................... 123/90.1, 1 R, 435; 701/102
See application file for complete search history.

(56) References Cited

U.S. PATENT DOCUMENTS

| | | | |
|---|---|---|---|
| 8,037,873 B2 | 10/2011 | Bression | |
| 8,627,647 B2 | 1/2014 | Bression | |
| 2009/0138180 A1* | 5/2009 | Bauer | F02D 37/02 701/104 |
| 2011/0023854 A1* | 2/2011 | Heilenbach | F02F 3/26 123/661 |
| 2012/0048245 A1* | 3/2012 | Knafl | F02D 41/0077 123/568.12 |

FOREIGN PATENT DOCUMENTS

| | | |
|---|---|---|
| DE | 102004006173 A1 | 8/2005 |
| DE | 102011114065 A1 | 3/2013 |
| JP | 2004218438 A | 8/2004 |
| WO | 2013041164 A1 | 3/2013 |

* cited by examiner

*Primary Examiner* — John Kwon
*Assistant Examiner* — Johnny H Hoang
(74) *Attorney, Agent, or Firm* — Julia Voutyras; McCoy Russell LLP

(57) ABSTRACT

A method and system for perform a charge exchange in internal combustion engine comprising an additional intake and exhaust valve lifts performed during positive pressure gradients between the intake and exhaust systems to reducing scavenging losses and increase torque during low engine speeds.

5 Claims, 5 Drawing Sheets

METHOD FOR PERFORMING A CHARGE EXCHANGE IN AN INTERNAL COMBUSTION ENGINE

CROSS REFERENCE TO RELATED APPLICATIONS

The present application claims priority to German Patent Application No. 102014205414.1, filed Mar. 24, 2014, the entire contents of which are hereby incorporated by reference for all purposes.

FIELD

The present disclosure relates a method and system of performing a charge exchange in an internal combustion engine.

BACKGROUND\SUMMARY

Engines may use a turbocharger or a supercharger to improve engine torque/power output density and minimize fuel consumption. In one example, a turbocharger may include a compressor and a turbine connected by a drive shaft, where the turbine is coupled to an exhaust manifold side and the compressor is coupled to an intake manifold side. However, such a supercharged or turbocharged engine, under low engine speed conditions, may experience torque drop due to a decrease in exhaust-gas mass flow which may subsequently lower a turbine pressure ratio.

One approach to address the issue of torque drop under low engine speed conditions has been to vary valve overlap through variable valve timing, for example. Another approach has been to use an exhaust-gas turbocharger with a small turbine cross-section or by the use of multiple exhaust-gas turbochargers.

The inventors herein have recognized various issues with the above systems. For example, scavenging losses may occur during valve overlap, which may prevent a full charge of fresh air from entering the cylinder and participating in combustion, thus reducing power output. Moreover, the large valve overlap needed to overcome torque deficit at low engine speeds may not be viable in internal combustion engines with high compression ratios, such as diesel engines, due to the proximity of the piston to the valves as it moves toward top dead center. An exhaust-gas turbocharger with a smaller cross-section may be able to generate charge pressure at low exhaust-gas flow rates, but may consequently shift the torque drop further toward lower engine speeds.

One approach that at least partially addresses the above issues is a method and a system, comprising opening at least one exhaust valve to maximum valve lift during a charge exchange of a combustion chamber comprising a piston, actuating at least one intake valve before the piston reaches top dead center of the combustion chamber during the charge exchange to perform an additional intake valve lift such that an intake pressure is greater than an exhaust pressure, then opening at least one inlet valve to maximum valve lift during the course of charge exchange and actuating at least one exhaust valve before the piston reaches bottom dead center during charge exchange to perform an additional exhaust valve lift such that intake pressure is greater than exhaust pressure. In this way, the additional valve lifts may reduce scavenging and/or may provide increased low end torque without increasing exhaust gas temperature, in one example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
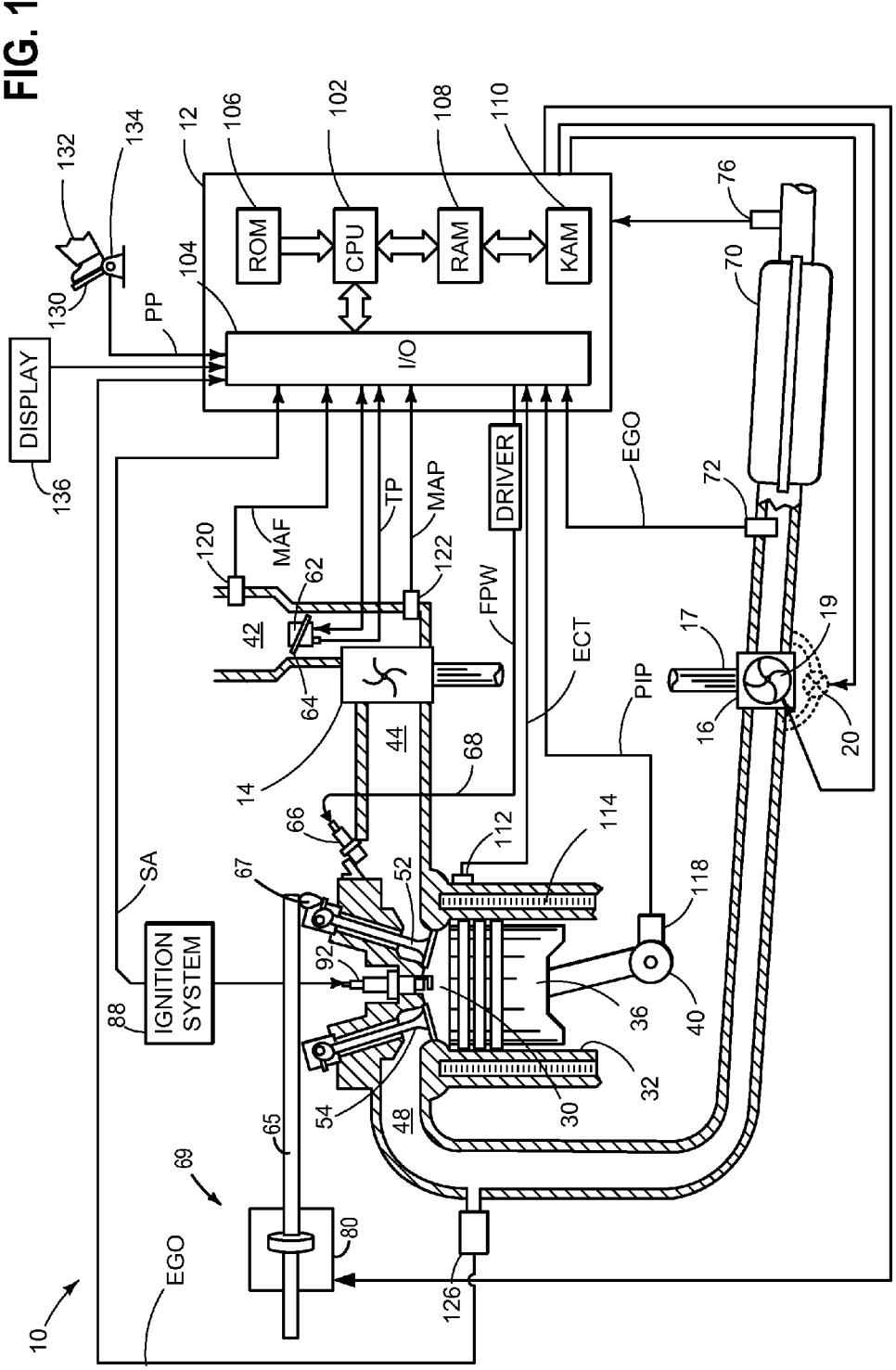
FIG. 1 schematically depicts an example vehicle system.

The present application relates to a system for performing a charge exchange in an internal combustion engine comprising at least one cylinder head with at least one cylinder, each cylinder comprising at least one inlet opening for the supply of fresh air via an intake system and comprising at least one outlet opening for discharging the exhaust gases via an exhaust-gas discharge system and comprising a piston which is movable along a piston longitudinal axis between a bottom dead center and a top dead center, and at least two valve drives with at least two valves which are movable along their longitudinal axis between a valve closed position and a valve open position, performing a maximum valve lift, in order to open up and block the at least one inlet opening and the at least one outlet opening of the at least one cylinder during the course of a charge exchange, and having at least two actuating devices for opening the valves counter to a preload force.

An internal combustion engine of the above-stated type is used as a drive for motor vehicles. Within the context of the present application, the expression "internal combustion engine" encompasses Otto-cycle engines, diesel engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

Internal combustion engines have a cylinder block and at least one cylinder head which are connected to one another to form at least one cylinder. To hold the pistons or the cylinder liners, the cylinder block has a corresponding number of cylinder bores. The cylinder head conventionally serves to hold the valve drive. To control the charge exchange, an internal combustion engine requires control elements and actuating devices for actuating the control elements. During the charge exchange of a cylinder, the combustion gases may be discharged via at least one outlet opening and the charging of the combustion chamber, that is to say the induction of the fresh air, takes place via at least one inlet opening. To control the charge exchange, in four-stroke engines, use may be made almost exclusively of lifting valves as control elements, which lifting valves perform an oscillating lifting movement along their longitudinal axis during the operation of the internal combustion engine and which lifting valves open and close the inlet and outlet openings in this way. The actuating device required for the movement of a valve, including the valve itself, is referred to as the valve drive.

It is the object of the valve drive to open and close the at least one inlet and/or outlet opening of a cylinder at the correct times, with a fast opening of the largest possible flow cross sections being sought in order to keep the throttling losses in the inflowing and outflowing gas flows low and in order to better enable the best possible charging of the cylinder and a complete discharge of the exhaust gases. According some approaches, therefore, a cylinder is also often and increasingly provided with two or more inlet and outlet openings.

According to some approaches, the intake lines which lead to the inlet openings, and the exhaust lines which adjoin the outlet openings, may be at least partially integrated in the cylinder head.

A primary aim in the development of internal combustion engines is that of minimizing fuel consumption. In this connection, too, the supercharging of internal combustion engines is becoming ever more important. Supercharging may be a suitable means for increasing the power of an internal combustion engine while maintaining an unchanged swept volume, or for reducing the swept volume while maintaining the same power. For the same vehicle boundary conditions, it is thus possible to shift the load collective toward higher loads, at which the specific fuel consumption may be lower. Supercharging of an internal combustion engine consequently assists in the efforts to minimize fuel consumption, that is to say to improve the efficiency of the internal combustion engine.

The configuration of the exhaust-gas turbocharging often poses difficulties, wherein it is basically sought to obtain a noticeable performance increase in all engine speed ranges. According to some approaches, however, a torque drop may be observed in the event of a certain engine speed being undershot. Said torque drop is understandable if one takes into consideration that the charge pressure ratio is dependent on the turbine pressure ratio. For example, if the engine speed is reduced, this leads to a smaller exhaust-gas mass flow and therefore to a lower turbine pressure ratio. This has the result that, toward lower engine speeds, the charge pressure ratio and the charge pressure likewise decrease, which equates to a torque drop.

The drop in charge pressure can basically be counteracted through the use of a small exhaust-gas turbocharger, that is to say an exhaust-gas turbocharger with a small turbine cross section, in order to be able to generate an adequate charge pressure even at low exhaust-gas flow rates. This will however ultimately only shift the torque drop further toward lower engine speeds. Furthermore, said approach, that is to say the reduction in size of the turbine cross section, is subject to limits because the desired supercharging and performance increase should be possible without restriction and to the desired extent even at high engine speeds.

According to some approaches, it has been sought to improve the torque characteristic of a supercharged internal combustion engine by various measures, for example by means of a small design of the turbine cross section in combination with exhaust-gas blow-off, or the use of multiple exhaust-gas turbochargers.

The torque characteristic may also be advantageously influenced by means of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the engine characteristic map can advantageously be expanded, specifically both in the direction of smaller compressor flows and also in the direction of larger compressor flows.

For example, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower engine speed range. This is achieved by designing the high-pressure turbine for small exhaust-gas mass flows and by providing a bypass line by means of which, with increasing exhaust-gas mass flow, an increasing amount of exhaust gas is conducted past the high-pressure turbine. For this purpose, the bypass line branches off from the exhaust-gas discharge system upstream of the high-pressure turbine and opens into the exhaust-gas discharge system again upstream of the low-pressure turbine, wherein a shut-off element is arranged in the bypass line in order to control the exhaust-gas flow conducted past the high-pressure turbine.

The response behavior of an internal combustion engine supercharged in this way is considerably improved in relation to a similar internal combustion engine with single-stage supercharging, because the relatively small high-pressure stage is less inert, that is to say the rotor of a smaller-dimensioned exhaust-gas turbocharger can be accelerated more rapidly.

The torque characteristic of a supercharged internal combustion engine may furthermore be improved by means of multiple turbochargers arranged in parallel, that is to say by means of multiple turbines of relatively small cross section arranged in parallel, wherein turbines may be activated successively with increasing exhaust-gas flow rate.

The torque characteristic of a supercharged internal combustion engine may also be improved by virtue of the at least one exhaust-gas turbocharger being supplemented by a mechanical charger, for example a compressor.

In addition to a conceptual improvement of the exhaust-gas turbocharging arrangement as described above, some approaches also include methods for improving the torque characteristic of an exhaust-gas-turbocharged internal combustion engine, the aim of which methods is to increase torque, and to overcome the torque deficit at low engine speeds, for example. Here, a basic cause of the torque deficit at low engine speeds is considered to be the excessively low exhaust-gas flow rate at low engine speeds.

By means of variable valve control, the valve overlap, that is to say the crank angle range in which the outlet is not yet closed while the inlet is open, can be varied. During the valve overlap, scavenging losses can occur, wherein some of the inducted fresh air flows through the cylinder without participating in the subsequent combustion. Variable valve control permits a variation of the valve overlap in a manner dependent, inter alia, on the engine speed.

In the case of the exhaust-gas-turbocharged applied-ignition internal combustion engines, at low engine speeds, a large valve overlap is suitable for considerably raising the maximum torque and improving transient operating behavior. A pressure gradient that exists between the inlet side and outlet side at low engine speeds assists an effective scavenging process of the cylinders with fresh air and better enables a greater cylinder charge and thus higher power.

In the case of Otto-cycle engines with a relatively low compression ratio of, for example, $\epsilon \approx 10$ for naturally aspirated engines or $\epsilon \neq 8 \ldots 9$ for supercharged engines, the torque deficit at low engine speeds may be counteracted with a large valve overlap. In the case of internal combustion engines with high compression ratio, such as for example diesel engines, a large valve overlap often cannot be implemented because the piston, as it passes through top dead center, comes very close to the inlet valves and/or the outlet valves, and opening of the valves in the context of a valve overlap is not possible to an unrestricted extent.

Against the background of that stated above, it is the object of the present application to specify a method according to the preamble of claim 1 by means of which the torque deficit at low engine speeds can be counteracted and the torque characteristic, in particular of an exhaust-gas-turbocharged internal combustion engine, can be improved.

Said object may be achieved by means of a method for performing a charge exchange in an internal combustion engine comprising at least one cylinder head with at least one cylinder, each cylinder comprising at least one inlet opening for the supply of fresh air via an intake system and at least one outlet opening for discharging the exhaust gases via an exhaust-gas discharge system and a piston which is movable along a piston longitudinal axis between a bottom dead center and a top dead center, and at least two valve drives with at least two valves which are movable along their longitudinal axis between a valve closed position and a valve open position, performing a maximum valve lift, in order to open up and block the at least one inlet opening and the at least one outlet opening of the at least one cylinder during the course of a charge exchange, and having at least two actuating devices for opening the valves counter to a preload force, wherein the inlet valve of the at least one inlet opening is actuated in such a way that said inlet valve performs an additional valve lift before the piston, during the course of the charge exchange, reaches top dead center and before the inlet valve, during the course of the charge exchange, performs the maximum valve lift.

According to the application, the inlet valve of the at least one inlet opening performs at least two valve lifts, wherein the main, relatively large valve lift, which serves primarily for the charge exchange, is preceded by an additional, relatively small valve lift.

The additional, relatively small valve lift serves for the scavenging of residual gas out of the cylinder. The scavenging of residual gas is assisted by virtue of the piston moving toward top dead center, passing through top dead center or being situated in the vicinity of top dead center shortly before top dead center, such that the combustion chamber volume present as the additional valve lift is performed is relatively small or is only insignificantly larger than the compression volume when the piston is at top dead center.

The extensive scavenging of the residual gas better enables the greatest possible cylinder fresh charge in the next working cycle and thus a greater energy yield in the subsequent combustion cycle, that is to say an increase in power and thus increase in torque at the same, in particular at a lower, engine speed.

In the case of exhaust-gas-turbocharged internal combustion engines, the scavenging process also has a further advantageous effect, specifically the effect that the turbine, arranged in the exhaust-gas discharge system, of an exhaust-gas turbocharger is provided with a greater mass flow. The greater mass flow through the turbine yields a higher turbine pressure ratio, a higher charge pressure ratio and thus, at the inlet side, a higher charge pressure, which likewise contributes to improved charging of the cylinder, that is to say to the greatest possible cylinder fresh charge in the next working cycle. This effect, too, leads to an increase in power, that is to say to an increase in torque at a constant engine speed.

The fresh air that is introduced into and/or conducted through the cylinder during the scavenging of residual gas is furthermore heated owing to convection as it flows over the piston crown and over the hot combustion chamber internal walls, such that the mass flow introduced into the exhaust-gas discharge system is at a higher temperature and thus has increased enthalpy. Furthermore, the hot scavenged residual gas further contributes to increasing the enthalpy of the mass flow that is supplied to the turbine. Aside from the increase in mass flow, the increase in enthalpy—as described above—also leads to a higher charge pressure and thus to an increase in torque.

Whereas, in the case of a relatively large valve overlap in which the inlet valve must be opened earlier and/or the outlet valve must be closed later, there is the risk of the piston, as it travels through top dead center, coming into contact with an open inlet valve and/or an open outlet valve, the additional lift according to the present application can be performed before top dead center is reached and with a spacing to top dead center, without the piston making contact with, and damaging, the open inlet valve.

The method according to the present application achieves the object on which the present application is based, specifically that of specifying a method by means of which the torque deficit at low engine speeds can be counteracted and the torque characteristic, in particular of an exhaust-gas-turbocharged internal combustion engine, can be improved.

Further advantageous embodiments of the method according to the present application will be explained in conjunction with the subclaims.

Embodiments of the method may be advantageous in which the inlet valve of the at least one inlet opening is actuated, for the purpose of performing the additional valve lift, while at least one outlet opening of the at least one cylinder is at least temporarily open. The fresh air that is introduced via the inlet opening during the course of the additional valve lift can, in the present case, flow unhindered through the cylinder and exit the cylinder via the outlet opening, whereby the scavenging process is advantageously assisted.

Embodiments of the method may be advantageous in which the inlet valve of the at least one inlet opening is actuated, for the purpose of performing the additional valve lift, only when a pressure gradient prevails which is such that the pressure in the intake system is higher than the pressure in the exhaust-gas discharge system.

A pressure gradient between the intake system and the exhaust-gas discharge system assists the scavenging process with fresh air, that is to say effective scavenging of the cylinder. In this connection, it must be taken into consideration that, owing to the intermittent charge exchange, gas-dynamic wave phenomena occur in the intake system and in the exhaust-gas discharge system, as a result of which the pressure at the inlet side and at the outlet side generally changes with time.

Embodiments of the method may be advantageous in which the additional valve lift of the inlet valve is performed up until 50° CA before top dead center.

Embodiments of the method may be advantageous in which the additional valve lift of the inlet valve is performed up until 30° CA before top dead center.

The closer to top dead center the additional valve lift is performed, the smaller is the present combustion chamber volume as the additional valve lift is carried out, and the more effective or pronounced is the scavenging process and/or the temperature increase of the scavenging air as it flows over the combustion chamber internal walls, for example over the piston crown. Both assist in increasing the torque, for example at low engine speeds. The crank angle point at which the additional valve lift is performed must be coordinated with the magnitude of the additional valve lift.

Embodiments of the method may be advantageous in which the inlet valve of the at least one inlet opening is, after performing the additional valve lift, moved into the closed position again before said inlet valve is opened again for the purpose of performing the maximum valve lift during the course of the charge exchange.

Embodiments of the method may however also be advantageous in which the inlet valve of the at least one inlet opening, after performing the additional valve lift, is not moved into the closed position but is opened further for the purpose of performing the maximum valve lift during the course of the charge exchange.

It may be the case that there is no time available for the inlet valve to be moved into the closed position after performing the additional valve lift, because said inlet valve must immediately be opened widely and fully for the purposes of the charge exchange. This may be the case for example if the additional valve lift is performed very close to top dead center.

In this connection, however, embodiments of the method may be advantageous in which the inlet valve of the at least one inlet opening, after performing the additional valve lift, is moved in the direction of the closed position in order to reduce the valve lift by up to half or less.

Here, embodiments of the method may likewise be advantageous in which the inlet valve of the at least one inlet opening, after performing the additional valve lift, is moved in the direction of the closed position in order to reduce the valve lift by at least one third.

Embodiments of the method may also be advantageous in which the inlet valve of the at least one inlet opening, after performing the additional valve lift, is moved in the direction of the closed position in order to reduce the valve lift by at least one quarter.

In the above method variants, a valve lift curve with at least two maxima is formed. That is to say that the inlet valve, when the additional valve lift is reached, is not directly opened further in order to perform the maximum valve lift for the purposes of a charge exchange, but is initially moved in the direction of the closed position. That is to say, the valve lift is initially reduced before a further opening is initiated.

This approach may for example be necessary if the additional valve lift is performed very close to top dead center, in order to prevent contact between the piston and the inlet valve. It is then advantageous to reduce the valve lift before the inlet valve is opened further, or fully, during the course of the charge exchange.

Nevertheless, when the additional valve lift is reached, the inlet valve may also be opened further directly, or with a delay, in order to perform the maximum valve lift for the purposes of a charge exchange.

Embodiments of the method may be advantageous in which an additional valve lift is performed which amounts to less than one quarter of the maximum valve lift.

Embodiments of the method may be advantageous in which an additional valve lift is performed which amounts to less than one sixth of the maximum valve lift.

Embodiments of the method may be advantageous in which an additional valve lift is performed which amounts to less than one eighth of the maximum valve lift.

The magnitude of the additional valve lift must basically be coordinated with the crank angle point at which the additional valve lift is performed. The closer to top dead center the additional valve lift is performed, the smaller the additional valve lift must be in order that the inlet valve does not come into contact with the piston during the course of the charge exchange. It may however be necessary to take numerous other parameters into consideration, for example the piston shape, the shape of the combustion chamber roof, but in particular the compression ratio $\epsilon$ of the cylinder or of the internal combustion engine.

Embodiments of the method may be advantageous in which an additional valve lift of less than 2 mm is performed.

Embodiments of the method may be advantageous in which an additional valve lift of less than 1.5 mm is performed.

The specifications for the additional valve lift in the above method variants are merely exemplary, and are intended to illustrate the relationship with respect to the maximum valve lift, which may readily amount to 8 mm to 12 mm.

Embodiments of the method may be advantageous in which a diesel engine is used as an internal combustion engine. As already stated, the method according to the present application is particularly advantageous in the case of internal combustion engines with a high compression ratio, for example diesel engines, in which, to realize a valve overlap, the valves cannot be actuated and opened arbitrarily as desired, because the piston comes very close to the valves as it passes through top dead center. In the case of the method according to the present application, there is no risk of the piston coming into contact with an open inlet valve.

Embodiments of the method may be advantageous in which a supercharged internal combustion engine is used as an internal combustion engine.

A pressure gradient between the intake system and exhaust-gas discharge system assists the scavenging of the cylinder with fresh air, that is to say the scavenging process, such that it is advantageous to enable a high pressure in the intake system. The latter may be achieved by virtue of the internal combustion engine being supercharged. The charge pressure generated by supercharging, which at low engine speeds is often higher than the exhaust-gas back pressure in the exhaust-gas discharge system, then prevails in the intake system.

The pressures in the intake system and in the exhaust-gas discharge system vary continuously owing to the intermittent charge exchange. The evacuation of the combustion gases is, at the start of the charge exchange, based on the high pressure difference between combustion chamber and exhaust-gas discharge system. This pressure-driven flow process is assisted by a high pressure peak. During the further course of the charge exchange, the pressures in the combustion chamber and in the exhaust-gas discharge system are equalized, and the combustion gases are discharged as a result of the lift movement of the piston. Relatively large changes in pressure likewise occur at the inlet side. Consequently, the pressure difference between the intake system and the exhaust-gas discharge system, that is to say between the inlet opening and the outlet opening of the cylinder, also varies constantly.

In this context, embodiments of the method may be advantageous in which an exhaust-gas-turbocharged engine is used as an internal combustion engine.

In the case of exhaust-gas-turbocharged internal combustion engines, the scavenging process has the special effect that the turbine, arranged in the exhaust-gas discharge system, of an exhaust-gas turbocharger has a greater mass flow supplied to it. Said greater mass flow through the turbine leads to a higher charge pressure at the inlet side and ultimately to an increase in torque.

The heating of the fresh air used for the scavenging process, and the scavenged residual gas, lead to an increase of the enthalpy of the exhaust-gas mass flow provided to the turbine, and thus likewise to an increase in torque.

Embodiments of the method may be advantageous in which the outlet valve of the at least one outlet opening is actuated in such a way that said outlet valve performs an additional valve lift before the piston, during the course of the charge exchange, reaches bottom dead center and after the outlet valve, during the course of the charge exchange, has performed the maximum valve lift.

If, during the intake process of the charge exchange, in which the piston moves downward, an outlet valve is opened before the piston reaches bottom dead center, the at least one inlet valve is still open. The fresh air introduced into the cylinder via the inlet opening can then flow through the cylinder, and exit the latter again via the outlet, owing to the valve lift additionally being performed by the outlet valve. The associated effects are, in part, the effects that have been described in conjunction with the additional valve lift of the inlet valve.

In the present case, scavenging of residual gas does not take place, or takes place at most to a negligible extent, as a result of which the advantages associated with residual gas scavenging, specifically the generation of a large cylinder fresh charge in the subsequent working cycle and the increase in enthalpy owing to the scavenged residual gas, may be eliminated.

In the case of exhaust-gas-turbocharged internal combustion engines, however, the scavenging process has the same advantageous effect, albeit not to the same extent. A greater mass flow is in turn provided to the turbine, arranged in the exhaust-gas discharge system, of an exhaust-gas turbocharger, whereby an increase in torque at constant engine speed is achieved. Said greater mass flow is however at a relatively low temperature, because the fresh air conducted through the cylinder is not, or cannot be, heated either by scavenged residual gas or by a piston, which is situated close to bottom dead center.

Even though an additional valve lift at the inlet side offers greater advantages than an additional valve lift at the outlet side, the implementation of an additional outlet-side valve lift has the advantage of reducing the sensitivity of the method with respect to changes in exhaust-gas back pressure.

Furthermore, the lack of heating of the fresh air can advantageously be utilized for targeted cooling of the mass flow supplied to the turbine, that is to say to lower the turbine inlet temperature. In this connection, it must be taken into consideration that the operation of an internal combustion engine is often, in particular at full load, limited by the maximum admissible temperature at the turbine inlet.

In this respect, the present method variant, in which the outlet valve of the at least one outlet opening performs an additional valve lift, may also be implemented with the exclusive aim of cooling the mass flow supplied to the turbine.

In the case of internal combustion engines in which each cylinder has at least two inlet openings for the supply of fresh air via an intake system and at least two outlet openings for the discharge of the exhaust gases via an exhaust-gas discharge system, embodiments may be advantageous wherein the inlet valves of at least two inlet openings are actuated in such a way that said inlet valves perform an additional valve lift.

In the case of internal combustion engines in which each cylinder has at least two inlet openings for the supply of fresh air via an intake system and at least two outlet openings for the discharge of the exhaust gases via an exhaust-gas discharge system, embodiments may be advantageous wherein the inlet valve of at least one inlet opening is actuated in such a way that said inlet valve performs an additional valve lift.

Turning to FIG. 1, a schematic diagram showing one cylinder of multi-cylinder engine 10, which may be included in a propulsion system of a vehicle, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. A pedal position of an accelerator pedal may be used to indicate a requested torque, $Tq_{req}$, to controller 12 via pedal position sensor 134. Combustion chamber (e.g., cylinder) 30 of engine 10 may include combustion chamber walls 32 with piston 36 positioned therein. Piston 36 may be coupled to crankshaft 40 so that a reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10. A drive wheel speed may indicate an available torque, $Tq_{avail}$ from the engine 10. Furthermore, the drive wheel speed and the accelerator pedal position sensor 134 may together indicate the available torque in relation to the requested torque.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake passage 42 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection. In some cases, direct injection may provide increased cooling engine cylinders which can reduce knocking and allow for higher compression ratios and increased engine efficiency as compared to operation without direct fuel injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, particulate filter, various other emission control devices, or combinations thereof. As an example, an engine may be operated at an overall stoichiometric air-fuel ratio in order to reduce NOx emissions. In some embodiments, during operation of engine 10, emission control device 70 may be periodically reset by operating at least one cylinder of the engine within a particular air/fuel ratio.

Full-volume exhaust gas sensor 76 is shown coupled to exhaust passage 48 downstream of emission control device 70. Sensor 76 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Further, a plurality of exhaust gas sensors may be located at partial volume locations within the emission control devices. Other sensors 72 such as an air mass (AM) sensor, additional EGO sensor, and/or a temperature sensor may be disposed upstream of emission control device 70 to monitor the AM, oxygen content, and temperature, respectively, of the exhaust gas entering the emission control device. The sensor locations shown in FIG. 1 are just one example of various possible configurations. For example, the emission control system may include a partial volume set-up with close coupled catalysts.

Compressor 14 draws air from air intake passage 42 to supply boost intake passage 42. Exhaust-gases spin turbine 16 which is coupled to compressor 14 via shaft 17. In some examples, a charge or intake air cooler may also be provided (not shown). Compressor speed may be adjusted via adjusting a position of variable vane control or compressor bypass valve. In alternative examples, a waste gate 20 may replace or be used in addition to variable vane control. Variable vane control may adjust a position of variable geometry vanes 19 of turbine 16. Exhaust-gases can pass through turbine 16 supplying little energy to rotate turbine 16 when vanes 19 are in an open position. Exhaust-gases can pass through turbine 16 and impart increased force on turbine 16 when vanes 19 are in a closed position. Alternatively, waste gate 20 allows exhaust-gases to flow around turbine 16 so as to reduce the amount of energy supplied to the turbine 16. Furthermore, turbine 16 may be a turbine with fixed geometry. A compressor bypass valve (not shown) may allow compressed air at the outlet of compressor 14 to be returned to the input of compressor 14. In this way, the efficiency of compressor 14 may be reduced so as to affect the flow of compressor 14 and reduce the possibility of compressor surge. In this way, the engine may comprise a turbocharged engine. In other examples, the engine may comprise a supercharged engine, wherein a supercharger compressor 14 is used to compress the intake air, but the compressor is not coupled to a shaft and is not driven by an exhaust turbine. Power for a supercharger compressor can be provided mechanically by a belt, gear, shaft, or chain connected to the engine's crankshaft, for example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; AM and/or temperature of the exhaust gas entering the catalyst from sensor 72; exhaust gas air to fuel ratio from sensor 76; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque (e.g., available torque). Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a cluster display device 136, for example to alert the driver of faults in the engine or exhaust after-treatment system.

Storage medium read-only memory 106 can be programmed with computer readable data representing instructions executable by processor 102 for performing the methods described below as well as other variants that are anticipated but not specifically listed.

Each combustion chamber (e.g., cylinder) 30 may be serviced by one or more valves. In the present example, each cylinder 30 includes a corresponding intake valve 52 and an exhaust valve 54. Engine 10 further includes one or more camshafts 65 for operating intake valve 52 and/or exhaust valve 54. In the depicted example, intake camshaft 65 is coupled to intake valve 52 and can be actuated to operate intake valve 52. In some embodiments, where the intake valve of a plurality of cylinders 30 are coupled to a common intake camshaft, the common intake camshaft can be actuated to operate the intake valves of all the coupled cylinders.

Intake valve 52 is actuatable between an open position that allows intake air into the corresponding cylinder and a closed position substantially blocking intake air from the cylinder. Intake camshaft 65 may be included in intake valve actuation system 69. Intake camshaft 65 includes intake cam 67 which has a cam lobe profile for opening intake valve 52 for a defined intake duration. In some embodiments (not shown), the camshaft may include additional intake cams with an alternate cam lobe profile that allows the intake valve 52 to be opened for an alternate duration (herein also referred to as a cam profile switching system). Based on the lobe profile of the additional cam, the alternate duration may be longer or shorter than the defined intake duration of intake cam 67. The lobe profile may affect cam lift height, cam duration, and/or cam timing. A controller may be able to switch the intake valve duration by moving intake camshaft 65 longitudinally and switching between cam profiles.

In the same manner, each exhaust valve 54 is actuatable between an open position allowing exhaust gas out of the corresponding cylinder and a closed position substantially retaining gas within the cylinder. It will be appreciated that while only intake valve 52 is shown to be cam-actuated, exhaust valve 54 may also be actuated by a similar exhaust camshaft (not shown). In some embodiments, where the exhaust valve of a plurality of cylinders 30 is coupled to a common camshaft, the exhaust camshaft can be actuated to operate the exhaust valves of all the coupled cylinders. As with intake camshaft 65, when included, the exhaust camshaft may include an exhaust cam having a cam lobe profile for opening exhaust valve 54 for a defined exhaust duration. In some embodiments, the exhaust camshaft may further include additional exhaust cams with an alternate cam lobe profile that allows exhaust valve 54 to be opened for an alternate duration. The lobe profile may affect cam lift height, cam duration, and/or cam timing. A controller may be able to switch the exhaust valve duration by moving the exhaust camshaft longitudinally and switching between cam profiles.

It will be appreciated that the intake and/or exhaust camshafts may be coupled to cylinder subsets, and multiple intake and/or exhaust camshafts may be present. For example, a first intake camshaft may be coupled to the intake valves of a first subset of cylinders while a second intake camshaft may be coupled to the intake valves of a second subset of cylinders. Likewise, a first exhaust camshaft may be coupled to the exhaust valves of a first subset of cylinders while a second exhaust camshaft may be coupled to the exhaust valves of a second subset of cylinders. Further still, one or more intake valves and exhaust valves may be coupled to each camshaft. The subset of cylinders coupled to the camshaft may be based on their position along an engine block, their firing order, the engine configuration, etc.

Intake valve actuation system 69 and exhaust valve actuation system (not shown) may further include push rods, rocker arms, tappets, etc. Such devices and features may control actuation of the intake valve 52 and the exhaust valve 54 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 30 may each have more than one exhaust valve and/or intake valve. In still other examples, each of the exhaust valve 54 and intake valve 52 of one or more cylinders may be actuated by a common camshaft. Further still, in some examples, some of the intake valves 52 and/or exhaust valves 54 may be actuated by their own independent camshaft or other device.

Engine 10 may include variable valve timing (VVT) systems, for example, variable cam timing (VCT) system 80. A variable valve timing system may be configured to open an intake valve for a first duration and an exhaust valve for a second duration. In one example, the system may be configured to perform an additional intake and/or exhaust valve lift based on engine operating conditions such as engine speed and exhaust air mass flow temperature.

VCT system 80 may be configured to advance or retard valve timing by advancing or retarding cam timing and may be controlled by controller 12. VCT system 80 may be configured to vary the timing of valve opening and closing events by varying the relationship between the crankshaft position and the camshaft position. For example, VCT system 80 may be configured to rotate intake camshaft 65 independently of the crankshaft to cause the valve timing to be advanced or retarded.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 80.

By adjusting VCT system 80, a position of intake camshaft 65 can be adjusted to thereby vary an opening and/or closing timing of intake valve 52. As such, by varying the opening and closing of intake valve 52, an amount of positive valve overlap between intake valve 52 and exhaust valve 54 can be varied. For example, VCT system 80 may be adjusted to advance or retard an opening and/or a closing of intake valve 52 relative to a piston position. VCT system 80 may also comprise a cam position sensor for detecting the position of a cam. The cam position sensor may also determine the rate of change of the cam position, from which the direction of the cam movement may be determined. For example, the cam position sensor may determine if a cam is moving towards a new cam position (e.g., away from the default pinned position), or towards the default pinned position (e.g., away from the new cam position. Furthermore, the cam position sensor may be able to detect the position of multiple cams so that a degree of cam synchronization between multiple cams can be determined. For example, by measuring instantaneous cam positions and/or rates of change of cam positions, the cam position sensor can determine the degree of synchronization between multiple cams.

During engine operation, a cylinder piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. During cylinder combustion, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

The valves may be operated with positive valve overlap wherein for a short duration before the end of the exhaust stroke and after the commencement of the intake stroke, both intake and exhaust valves may be open. This period, during which both valves may be open, is referred to as a positive (intake to exhaust) valve overlap. As elaborated herein, the VCT system 80 may be adjusted so that an amount of positive valve overlap during selected engine operating conditions is increased. In one example, valve positive valve overlap may occur as a result of additional valve lift(s). An extra intake valve lift just before the gas exchange top-dead center results in a positive valve overlap and a positive pressure gradient. Likewise, an extra exhaust valve lift just before the piston bottom-dead center during the intake stroke results in positive valve overlap and positive pressure gradient. These extra valve events must be switchable (on/off).

FIG. 1 also shows a controller 12, which may be any electronic control system of the vehicle in which engine 10 is installed. In embodiments where at least one intake or exhaust valve is configured to open and close according to an adjustable timing, the adjustable timing and/or the additional valve lifts may be controlled via the electronic control system to regulate an amount of exhaust present in a combustion chamber during ignition. For example, positive valve overlap may be increased in order to scavenge combusted exhaust gases from the engine cylinders.

The electronic control system may also be configured to command the opening, closure and/or adjustment of various other electronically actuated valves in the engine 10 as needed to enact any of the control functions described herein. These valves may include throttle valves, compressor by-pass valves, waste gates, EGR valves and shut-off valves, various reservoir intake and exhaust valves, for example. The controller may also adjust the amount of fuel, as well as injection timing, of the fuel injectors. As such, the controller may adjust the VCT system and an air-fuel ratio. Further, to assess operating conditions in connection with the control functions of the engine 10, the controller may be operatively coupled to a plurality of sensors arranged throughout the engine 10. These may include flow sensors, temperature sensors, pedal-position sensors, pressure sensors, a mass air flow sensor, etc. Specifically, a pedal position sensor 134 is shown coupled to an accelerator pedal 130 for sensing force applied by vehicle operator 132. The controller 12 may use data from these various sensors to estimate other engine operating conditions.

Figure 2A:
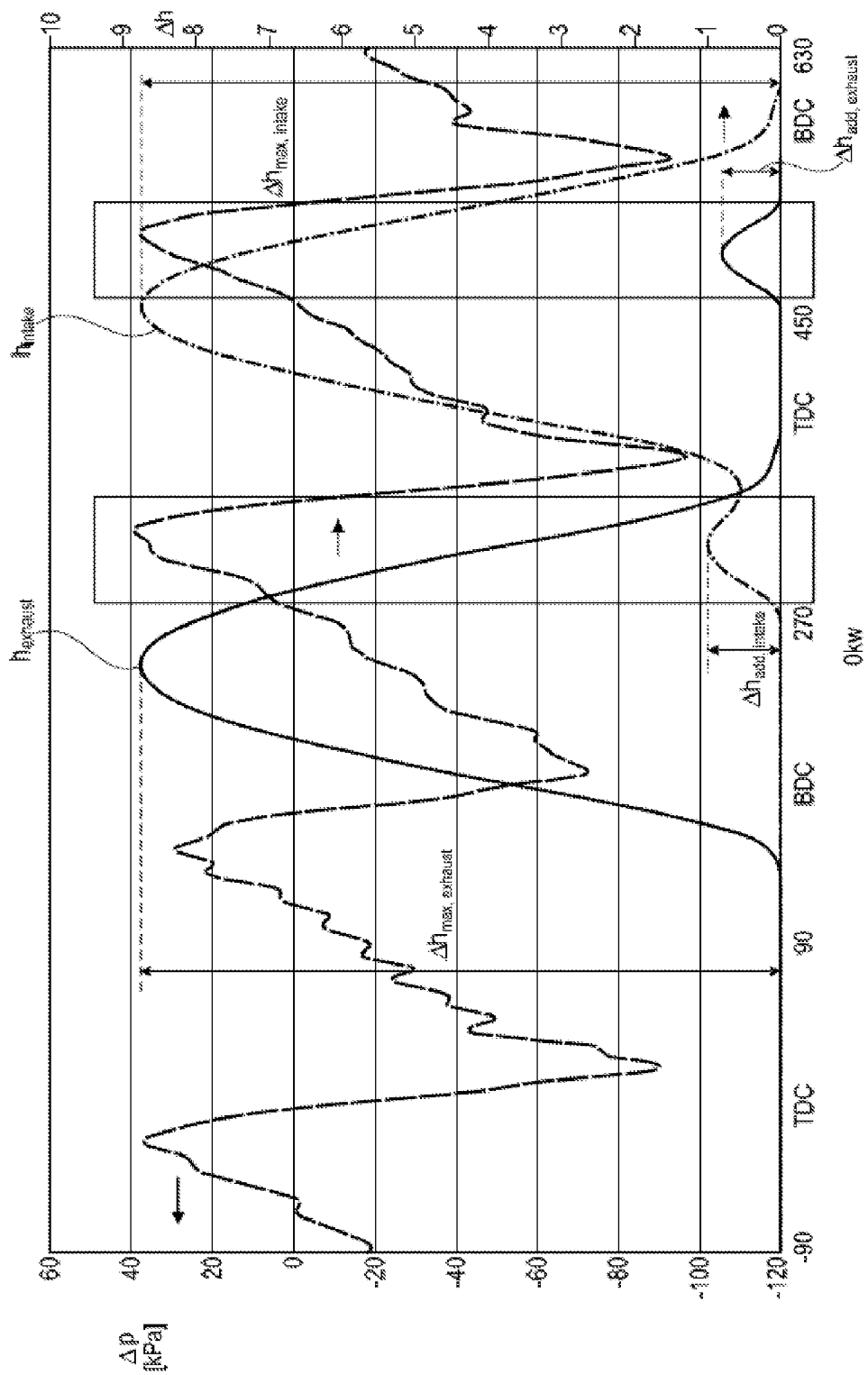
FIG. 2A shows, in a diagram, the valve lift curves $h_{intake}$, $h_{exhaust}$ of an inlet valve and of an outlet valve.

FIG. 2A shows, in a diagram, the valve lift curves $h_{intake}$, $h_{exhaust}$ of an inlet valve and of an outlet valve in accordance with a first embodiment of the method. Also illustrated is the pressure difference $\Delta p$ between the intake system and the exhaust-gas discharge system, that is to say between the inlet side and the outlet side.

During the charge exchange, the exhaust gas may be evacuated from the cylinder by virtue of the outlet valve being opened and performing the maximum valve lift $\Delta h_{max,exhaust}$. The inlet valve is consequently opened in order to fill the cylinder with fresh air again, wherein the inlet valve performs the maximum valve lift $\Delta h_{max,intake}$ during the course of the charge exchange.

The inlet valve is in this case actuated such that said inlet valve performs an additional valve lift $\Delta h_{add,intake}$, specifically before the inlet valve performs the maximum valve lift $\Delta h_{max,intake}$ during the course of the charge exchange and before the piston reaches top dead center during the course of the charge exchange. Consequently, the inlet valve performs two valve lifts $\Delta h_{max,intake}$, $\Delta h_{add,intake}$, wherein the actual, relatively large valve lift $\Delta h_{max,intake}$, which serves primarily for the charge exchange, may be preceded by an additional, relatively small valve lift $\Delta h_{add,intake}$. The additional, relatively small valve lift $\Delta h_{add,intake}$ serves for the scavenging of residual gas out of the cylinder. The scavenging of residual gas may be assisted by the piston moving toward top dead center, whereby the combustion chamber volume may be reduced in size. A positive pressure gradient $\Delta p$ between the intake system and exhaust-gas discharge system additionally assists the scavenging process with fresh air. As great a cylinder fresh charge as possible in the next working cycle better enables an increase in power and an increase in torque at an unchanged engine speed.

In the case of exhaust-gas-turbocharged internal combustion engines, the scavenging process has the effect that the turbine arranged in the exhaust-gas discharge system may be provided with a greater mass flow, whereby a higher charge pressure can be generated at the inlet side. The higher charge pressure likewise leads to an increase in torque at a constant engine speed. The hot scavenged residual gas increases the enthalpy of the mass flow supplied to the turbine, which may be additionally increased yet further by virtue of the fresh air that is conducted through the cylinder during the course of the scavenging of residual gas being heated by convection as it flows through the cylinder.

In the present case, the inlet valve, after performing the additional valve lift $\Delta h_{add,intake}$, may not be moved back into the closed position but may be opened further for the purpose of performing the maximum valve lift $\Delta h_{max,intake}$ during the course of the charge exchange. However, the inlet valve, after performing the additional valve lift $\Delta h_{add,intake}$, may be initially moved in the direction of the closed position, in order to reduce the valve lift approximately by half, before said inlet valve is opened further for the purpose of performing the maximum valve lift $\Delta h_{max,intake}$. The valve lift curve thus formed has two maxima.

In the first method variant as per FIG. 2A, the outlet valve may be actuated in such a way that said outlet valve likewise performs an additional valve lift $\Delta h_{add,exhaust}$.

The outlet valve may be opened again after the outlet valve has performed the maximum valve lift $\Delta h_{max,exhaust}$ during the course of the charge exchange and before the piston reaches bottom dead center during the course of the intake process.

While the outlet valve performs the additional valve lift $\Delta h_{add,exhaust}$, the inlet valve remains open. The fresh air introduced into the cylinder via the inlet opening can exit the cylinder again via the outlet. A positive pressure gradient $\Delta p$ between the intake system and exhaust-gas discharge system assists the flow through the cylinder. The additional valve lift $\Delta h_{add,exhaust}$ of the outlet valve serves less for the scavenging of residual gas and more for the cooling of the mass flow supplied to the turbine, that is to say for lowering the turbine inlet temperature. Specifically, the fresh air conducted through the cylinder may not be heated either by scavenged residual gas or by a piston, which is situated adjacent to bottom dead center. A cooling effect can be achieved owing to the lack of heating of the fresh air as it flows through the cylinder.

The additional valve lift $\Delta h_{add,exhaust}$ of the outlet valve is furthermore also suitable, albeit not to the same extent, for increasing the mass flow supplied to the turbine and thus for increasing torque at a constant engine speed, although this increased mass flow may be at a lower temperature. In this respect, an outlet-side additional valve lift $\Delta h_{add,exhaust}$ assists the inlet-side additional valve lift $\Delta h_{add,intake}$.

Figure 2B:
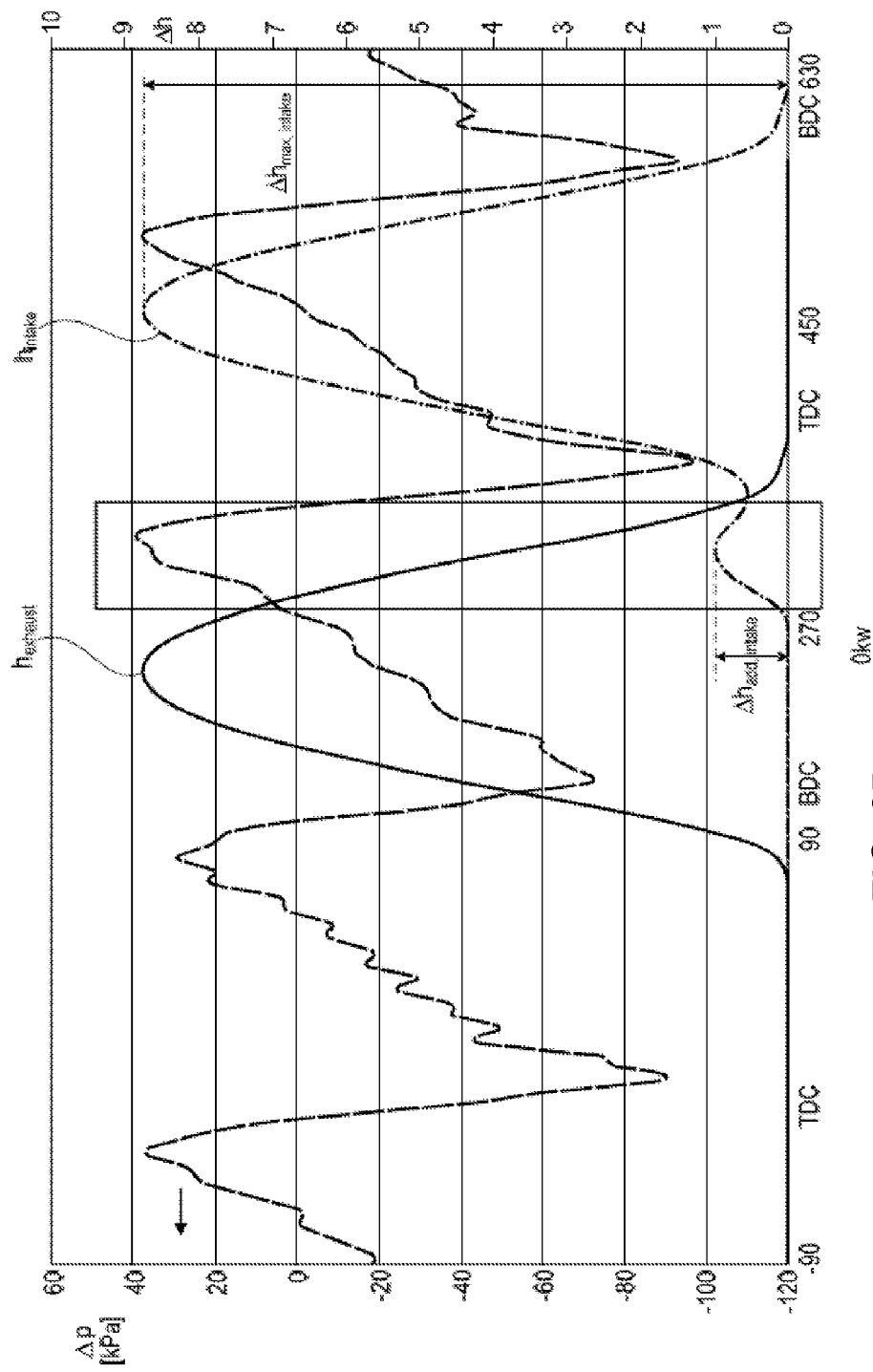
FIG. 2B shows, in a diagram, the valve lift curves hintake, hexhaust of an inlet valve and of an outlet valve.

FIG. 2B shows, in a diagram, the valve lift curves $h_{intake}$, $h_{exhaust}$ of an inlet valve and of an outlet valve in accordance with a second embodiment of the method. The pressure difference $\Delta p$ between the intake system and the exhaust-gas discharge system is likewise illustrated.

It is sought to explain only the differences in relation to the method variant illustrated in FIG. 2A, for which reason reference is otherwise made to FIG. 2A. The same reference signs are used.

By contrast to the method variant illustrated in FIG. 2A, it is the case in the method variant illustrated in FIG. 2B that an additional valve lift $\Delta h_{add,exhaust}$ of the outlet valve may be omitted.

An additional valve lift $\Delta h_{add,exhaust}$ of the outlet valve may not be used either for increasing the mass flow supplied to the turbine for the purposes of increasing torque or for cooling said mass flow for the purposes of lowering the turbine inlet temperature.

Figure 3:
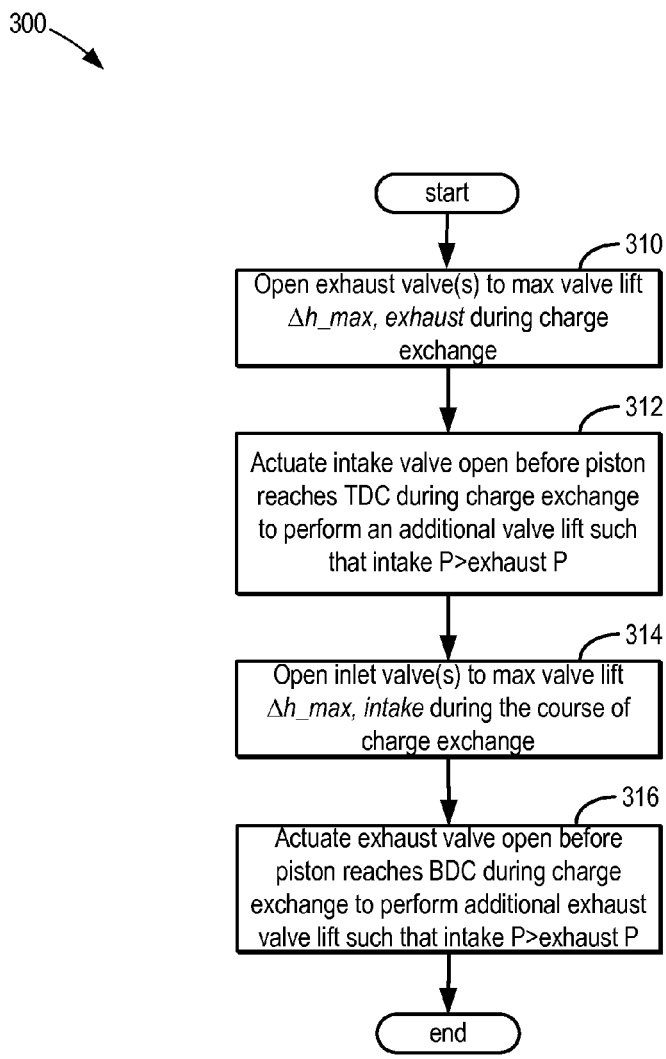
FIG. 3 shows an example method flowchart of the additional valve lifts.

Turning now to FIG. 3, an example method flowchart 300 for actuating the additional valve lifts its shown. The method may include actuating device 69 from FIG. 1, for example.

At 310, the method may include opening exhaust valve(s) to max valve lift $\Delta h_{max,exhaust}$ during charge exchange of a combustion chamber (combustion chamber 30 from FIG. 1, for example). In one example, the exhaust valve is opened to a maximum valve lift during the exhaust stroke wherein the piston (such as piston 36 from FIG. 1, for example) moves toward TDC.

At 312, the method may include actuating an intake valve or intake valves open before the piston reaches TDC during the charge exchange to perform an additional valve lift such that intake system pressure is greater than exhaust-gas discharge system pressure. For example, the intake valve may be actuated to open after the maximum exhaust valve lift but before the exhaust valve closes during the exhaust stroke and before the maximum intake valve lift. In one example the additional valve lift may be performed up until 50° CA before TDC. In another example, the additional valve lift may be performed up until 30° CA before TDC. In this way, both an exhaust valve and intake valve are open, resulting in a positive valve overlap. Further, the additional intake valve lift may occur such that there is a positive pressure gradient during the course of the additional valve lift. A return to a negative pressure gradient marks the intake valve closing or moving towards closing before opening to maximum intake valve lift. Further, the pressure curve of FIGS. 2A and 2B, for example, may vary upon operating conditions so that the timing and occurrences of the additional valve lifts may also vary. However, the additional valve lifts still occur during the engine strokes as portrayed such that the intake system pressure is greater than exhaust system pressure. The intake valve may be actuated by a valve drive, such as valve actuation system 69 from FIG. 1, for example. The additional valve lift may be less than 2 mm, or less 1.5 mm.

At 314, the method may include opening inlet valve(s) to maximum valve lift $\Delta h_{max,intake}$ during the course of charge exchange. In one example, the maximum valve lift may occur during the intake stroke, such that the piston is moving from TDC to BDC.

At 316, the method may include actuating an exhaust valve or exhaust valves to open before piston reaches BDC to perform an additional exhaust valve lift such that intake pressure is greater than exhaust pressure. For example, the exhaust valve may be actuated to open at or after the intake valve has reached a maximum valve lift and closes before the piston reaches BDC such that an intake and exhaust valve are open simultaneously. Furthermore, the opening and closing of the additional exhaust valve lift, like the additional intake valve lift, corresponds to a positive pressure gradient such that intake pressure is greater than exhaust pressure. The method may then end.

Figure 4:
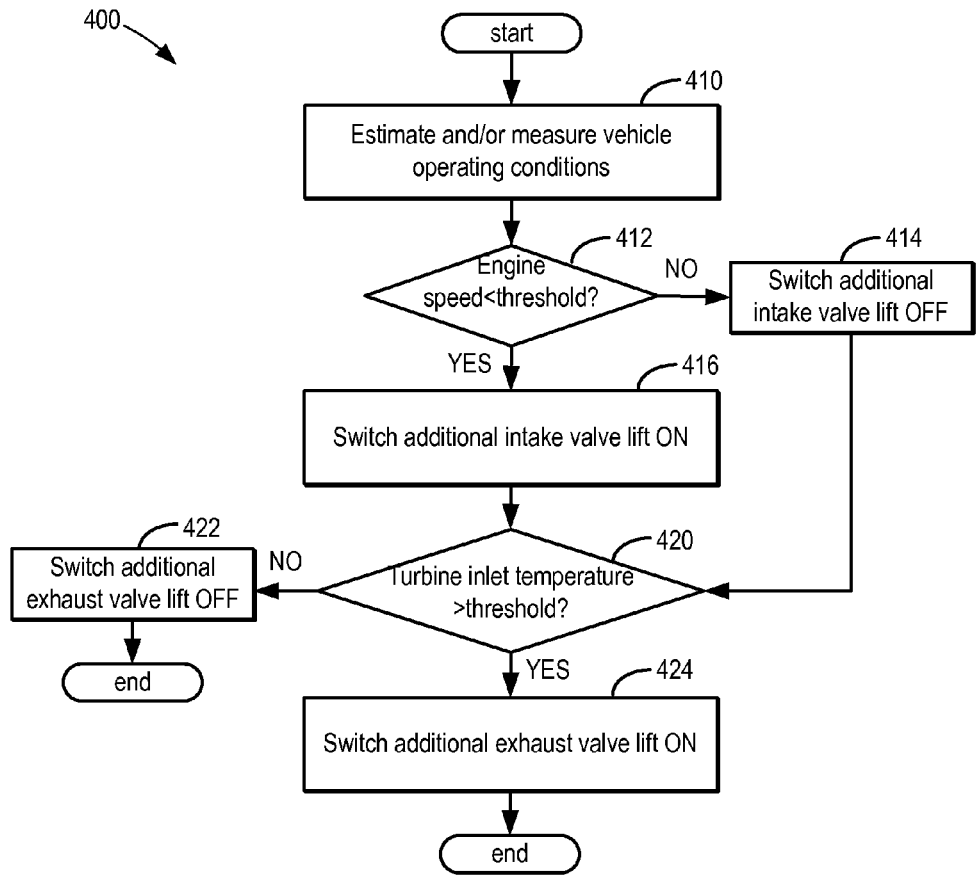
FIG. 4 shows an example operating routine for the additional valve lift system.

Turning now to FIG. 4, an example operating routine 400 is shown. This routine may be performed by a controller, such as controller 20 from FIG. 1, in order that additional valve lifts occur according to the method of FIG. 3, for example.

At 410, the method may include estimating and/or measuring vehicle operating conditions. For example, engine speed, engine load, turbine inlet temperature, mass air flow, variable valve timing, crank angle, etc. may be estimated and/or measured by the various sensors shown in FIG. 1, for example.

At 412, the method may determine whether engine speed, e.g. RPM, is below a threshold. In one example, the threshold may be 2500 RPM, and a speed range under 2500 RPM may be a low speed range wherein at certain time frames of the engine cycle, the pressure at the intake valve is higher than the pressure at the exhaust valve.

If yes, the method may switch additional intake valve lift ON, for example, by a switchable roller finger follower. When ON, the controller may send instructions stored in non-transitory memory to signal the actuation of the intake valve to perform an additional valve lift according to the method steps displayed from 310 to 312 of FIG. 3, for example.

If no, the method may switch additional intake valve lift OFF and proceed to 420.

At 420, the method may determine if turbine inlet temperature is greater than a threshold temperature. The temperature may be determined by a temperature sensor for example.

If yes, the method may switch the additional exhaust valve lift ON at 424. When ON, the controller may send instructions stored in non-transitory memory to signal the actuation of the exhaust valve to perform an additional valve lift according to the method steps 314 and 316 of FIG. 3, for example. In this way, fresh air is blown through the cylinder, but is not being heated by residual gas or the hot piston as the piston is at BDC. Some engines, such as diesel engines, may be limited by exhaust gas temperature at full load. An additional exhaust valve lift may control exhaust temperature and may provide a cooling effect to counteract the increase in exhaust temperature that may be caused by the additional intake valve lift if desired. The method may then end.

If no, the method at 422 may switch the additional exhaust valve OFF and end.

In this way, the method provides for switchable extra valve lifts which may increase low end torque with and/or without temperature increase to increase power and reduce scavenging losses.

Note that a cylinder cycle may be repeatedly performed in each cylinder, a single cylinder cycle including in one example intake, compression, combustion/expansion, and exhaust strokes. Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

REFERENCE SYMBOLS $h_{exhaust}$ Valve lift of an outlet valve
$h_{intake}$ Valve lift of an inlet valve
$\Delta h$ Valve lift
$\Delta h_{max,exhaust}$ Maximum valve lift of an outlet valve
$\Delta h_{max,intake}$ Maximum valve lift of an inlet valve
$\Delta h_{add,exhaust}$ Additional valve lift of an outlet valve
$\Delta h_{add,intake}$ Additional valve lift of an inlet valve
$\Delta p$ Pressure difference between intake system and exhaust-gas discharge system
° CA Degrees crank angle

The invention claimed is:

1. A method comprising:
during a single cylinder combustion cycle in an engine cylinder and responsive to a positive pressure gradient between an intake system and an exhaust system, actuating an inlet valve of the engine cylinder to perform a maximum inlet valve lift and an additional inlet valve lift and actuating an exhaust valve of the engine cylinder to perform a maximum exhaust valve lift and an additional exhaust valve lift.

2. The method of claim 1, wherein the inlet valve is actuated to perform the additional inlet valve lift before a piston of the engine cylinder reaches top dead center during charge exchange and before the inlet valve performs the maximum inlet valve lift in the single cylinder combustion cycle.

3. The method of claim 2, wherein the exhaust valve is actuated to perform the additional exhaust valve lift before the piston, during the charge exchange, reaches bottom dead center and after the exhaust valve, during the charge exchange, has performed the maximum exhaust valve lift.

4. The method of claim 1, wherein the engine is spark ignited and turbocharged with direct fuel injection.

5. The method of claim 1, wherein the positive pressure gradient is in response to an intake system pressure being greater than an exhaust system pressure.

* * * * *